United States Patent [19]
de Villiers

[11] 3,724,498
[45] Apr. 3, 1973

[54] VALVES
[76] Inventor: John Laddier de Villiers, 1 Brakfontein, Verwoedburg District, Republic of South Africa
[22] Filed: Jan. 10, 1972
[21] Appl. No.: 216,458

Related U.S. Application Data
[62] Division of Ser. No. 54,343, July 13, 1970, abandoned.

[52] U.S. Cl..................................137/607, 137/636
[51] Int. Cl...............................................F16k 19/00
[58] Field of Search ......137/607, 627, 636; 251/61.1

[56] References Cited

UNITED STATES PATENTS

| | | | |
|---|---|---|---|
| 2,629,400 | 2/1953 | Horrell | 137/636 X |
| 1,648,126 | 11/1927 | Hosmer | 137/607 |
| 2,180,320 | 11/1939 | Hansen | 137/635 X |
| 2,975,851 | 3/1961 | Youmans et al. | 137/636 X |

FOREIGN PATENTS OR APPLICATIONS

| | | | |
|---|---|---|---|
| 12,336 | 0/1903 | Great Britain | 137/607 |

*Primary Examiner*—Robert G. Nilson
*Attorney*—Karl W. Flocks

[57] ABSTRACT

A valve comprising means defining a flow passage, valve seat means in the passage, a bias chamber to receive a working fluid and having a wall which is displaceable and adapted to cooperate with the valve seat means to regulate fluid flow through the passage, and control means to control the volume of fluid held captive in the bias chamber thereby controlling the displacement of the displaceable wall relative to the valve seat means. The control means comprises an inlet bleed passage to place the bias chamber in communication with a source of working fluid under pressure, an outlet bleed passage leading out of the bias chamber, and inlet and outlet control valves operatively associated with the bleed passages, with the control valves biassed into their closed positions.

4 Claims, 3 Drawing Figures

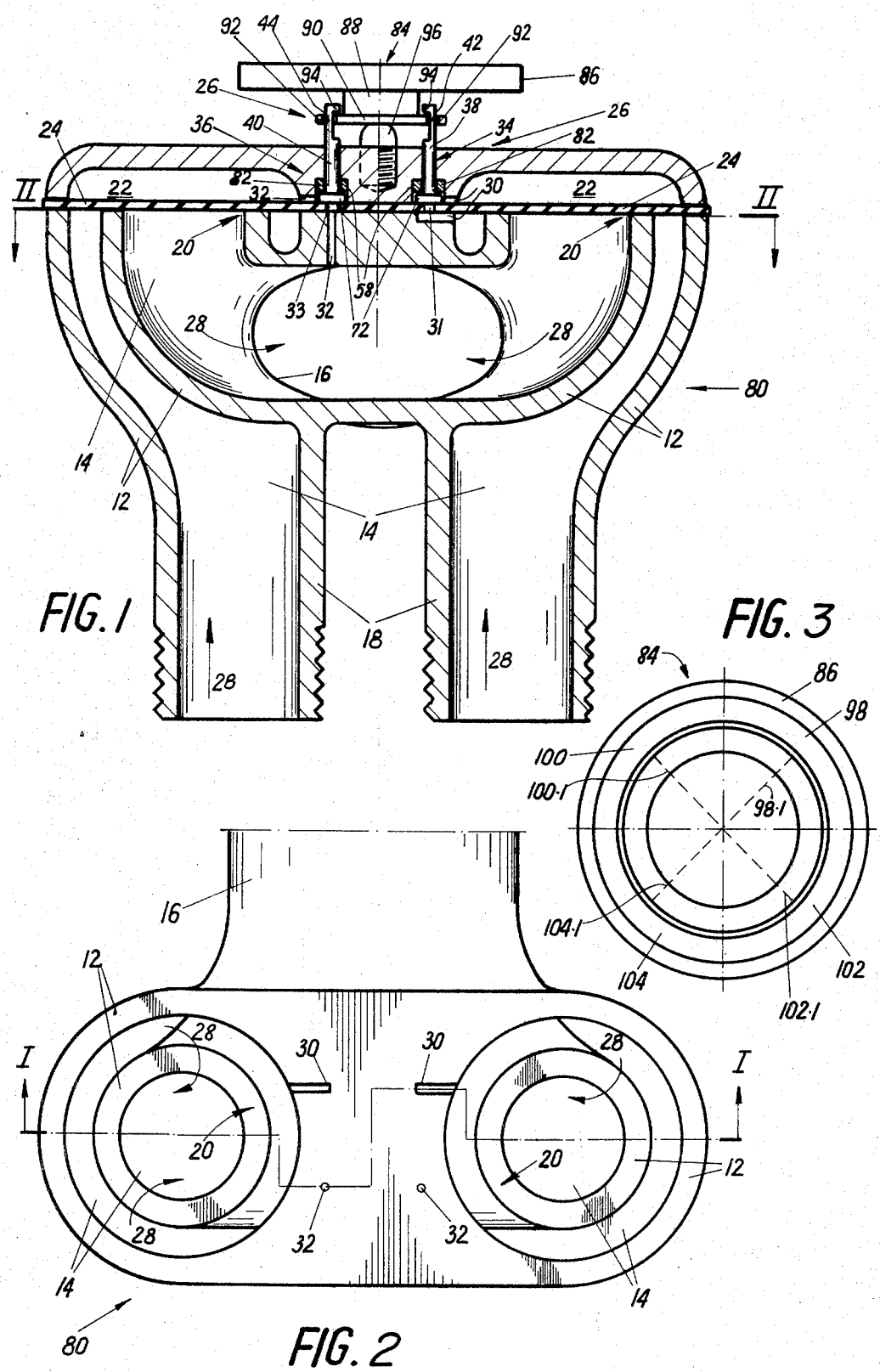

VALVES

This is a divisional application of applicant's pending application Ser. No. 54,343, filed July 13, 1970 now abandoned.

FIELD OF INVENTION

This invention relates to improvements in and relating to valves.

SUMMARY OF INVENTION

According to the invention there is provided a valve comprising means defining a flow passage, valve seat means in the passage, a bias chamber to receive a working fluid having a wall which is displaceable and adapted to cooperate with the valve seat means to regulate fluid flow through the flow passage, and control means to control the volume of working fluid held captive in the bias chamber.

The displaceable wall may be adapted to cooperate with the valve seat means by having a valve closure element operatively connected thereto for cooperating with the valve seat means.

The valve closure element may be operatively connected to the displaceable wall by, for example, being connected directly thereto. Alternatively, it may be operatively connected via a transmission conduit containing an incompressible fluid, so that displacement of the displaceable wall will be transmitted to the valve closure element via the incompressible fluid. It is thus possible to have the bias chamber fixed at a point remote from the valve.

The control means may comprise an inlet bleed passage to place the bias chamber in communication with a source of working fluid under pressure, an outlet bleed passage leading out of the bias chamber, and an inlet and outlet control valves operatively associated with the inlet and outlet bleed passages respectively.

The control valves may be or may be adapted to be, biassed into the closed positions. The control valves may be biassed into their closed positions by suitable bias means and/or by fluid pressure in the inlet and outlet bleed passages.

Each control valve may include a valve stem adapted to be slidably displaced to open the control valve. The stems may have a length so that they have free ends projecting out of the valve, thereby allowing them to be displaced by pushing or pulling the projecting free ends.

The inlet bleed passage may lead from the bias chamber to the upstream side of the flow passage, and the outlet bleed passage may lead to the downstream side of the flow passage.

The invention further extends to a double valve comprising two valves as described, integrally connected to each other. The downstream sides of the flow passages of the two valves may be common.

The control means of the two valves comprising the double valve, may be operatively connected to an actuating member to allow both independant and simultaneous actuation of the control means of the two valves.

Further in accordance with the invention, in a valve having a flow passage, valve seat means in the flow passage, and a bias chamber to receive a working fluid and having a wall which is displaceable and adapted to cooperate with the valve seat means, a method of regulating the rate of fluid flow through the flow passage includes the step of controlling the volume of working fluid held captive in the bias chamber.

The displaceable wall may conveniently be in the form of a flexible diaphragm.

Either or both of the inlet and outlet bleed passages may have varying means which is adjustable to vary the cross-sectional area of the bleed passages. The varying means may for example be in the form of screws which can be screwed into or out of the bleed passages substantially transversely to their axial directions to vary their cross-sectional areas.

The valve of this invention can have application in numerous fields, and can be used with fluids such as gases or liquids. It is however particularly suitable for use with fluids in the form of liquids. It further has particular application in the form of domestic taps and the like.

BRIEF DESCRIPTION OF THE DRAWINGS

The invention is now described by way of example with reference to the accompanying drawings.

In the drawings:

FIG. 1 shows a sectional side elevation along line I—I in FIG. 2 of a double valve in the form of a tap;

FIG. 2 shows a sectional plan view of the double valve of FIG. 1, along line II—II in FIG. 1;

FIG. 3 shows a plan view of the actuating member of the double valve of FIG. 1.

DESCRIPTION OF THE PREFERRED EMBODIMENTS

With reference to FIGS. 1, 2 and 3 of the drawings, reference numeral 80 refers generally to a double valve in the form of a tap, and comprising two valves as described herein integrally connected to each other, and having a common outlet 16. The two valves of the double valve 80 each comprises means 12 defining a flow passage 14, an inlet 18 for connection to a water supply source under pressure, valve seat means 20 in the flow passage 14, a bias chamber 22 to receive a working liquid in the form of water from the water supply source and having a wall 24 which is displaceable and adapted to cooperate with the valve seat means 20 to regulate fluid flow through the flow passage 14, and control means 26 to control the volume of working fluid held captive in the bias chamber 22.

Each displaceable wall 24 is in the form of a flexible diaphragm which is adapted to cooperate with its valve seat means 20 by seating directly thereon.

The water is adapted to flow through the flow passages 14 in the direction indicated by the arrows 28.

The control means for each of the valves of the double valve 80 comprises an inlet bleed passage 30 to place the bias chamber 22 in communication with the water supply source, an outlet bleed passage 32 leading out of the bias chamber 22, and inlet and outlet control valves 34 and 36 operatively associated with the inlet and outlet bleed passages 30 and 32.

Each inlet bleed passage 30 is formed by two grooves communicating with each other through an aperture 31 provided in the diaphragm 24. Each outlet bleed passage 32 is formed by a groove and a bore communicating with each other through an aperture 33 provided in the diaphragm 24.

Each set of inlet and outlet control valves 34 and 36 have valve stems 38 and 40 with free ends 42 and 44 projecting out of the double valve 80.

The stems 38 and 40 are located in bores which are countersunk from their inner sides to provided recesses 58. The valve stems 38 and 40 have valve closure members 72 provided at their inner ends to cooperate with the apertures 31 and 33 in the diaphragms 24 for closing the bleed passages 30 and 32.

The inlet and outlet control valves 34 and 36 are biassed into their closed positions by resilient sealing means 82 compressed in the recesses 58 and bearing against the valve closure members 72.

The control means 26 of the two valves of the double valve 80 are operatively connected to an actuating member 84 to allow both independent and simultaneous actuation of the control means of the two valves.

The actuating member 84 comprises a head portion in the form of a disc 86 having a stem 88 and a base plate 90.

The base 90 has slots 92 within which the free ends 42 and 44 of the inlet and outlet control valves 34 and 36 are slidably located. The free ends 42 and 44 are held in the slots 92 by shoulders 94.

The base plate 90 is pivotally located on a fulcrum 96 by the resilient sealing means 82 causing the shoulders 94 to bear down on the base plate 90.

The disc 86 of the actuating member 84 has, as shown in FIG. 5 of the drawings, four zones 98, 100, 102, and 104. The central lines 98.1, 100.1, 102.1 and 104.1 of each of these zones is directly above one of the control valves.

In use, if the zone 98 is depressed by downward pressure on the central line 98.1, the slot 92 directly below the line 98.1 will side downwardly along the free end 42 located therein, while the valve stem 40 below the central line 104.1 will be raised to lift its valve closure member 72 off the aperture 33 thereby allowing water to leave the bias chamber 22 through the outlet bleed passage 32.

Thus, any one of the inlet and outlet control valves can be independently opened by depressing the disc 86 on the central line of a diametrically opposed zone.

Furthermore, both inlet control valves 34 can be opened to the same extent by depressing the disc 86 on the line separating the zones 102 and 104. Similarly, the outlet control valves 36 can both be opened to the same extent by depressing the disc 86 on the line separating the zones 98 and 100.

It will readily be appreciated that the two valves comprising the double valve 80 can be simulataneously actuated to provide different rates of continuous flow through the two valves by depressing the disc 86 at the point spaced from the line separating the zones 98 and 100.

The double valve 80 is thus particularly suitable for use as a domestic tap with the inlet 18 of the one valve being connected to the cold water supply, and the inlet 18 of the other valve being connected to the hot water supply.

It is an advantage of this invention that, for a constant fluid pressure from the fluid supply source, a desired constant rate of fluid flow through the flow passage can be obtained by allowing the appropriate quantity of fluid to enter or leave the bias chamber. Once a certain quantity of fluid has been allowed to escape from or enter the bias chamber, there will be a constant rate of fluid flow through the flow passage until a further quantity of fluid is allowed to enter or leave the bias chamber.

Those embodiments of the invention which have the inlet and outlet control valves slidably located, present the further advantage that fluid flow can be initiated or stopped simply by finger pressure to displace the stem of the outlet or inlet control valve. Furthermore, the rate of continuous fluid flow through the valve can be regulated by controlling the period for which the inlet or outlet control valve is held in its open position by finger pressure.

The valves of this invention may be made of any suitable material. Thus, for example, they may be made of suitable metals, suitable metal alloys, suitable synthetic plastic materials, and the like.

I claim:

1. A double valve comprising a first valve and a second valve integrally connected to each other, each of the first and second valves comprising means defining a flow passage, valve seat means in the passage, a bias chamber to receive a working fluid and having a wall which is displaceable and adapted to co-operate with the valve seat means to regulate fluid flow through the flow passage, and control means to control the volume of working fluid held captive in the bias chamber, each control means comprising an inlet bleed passage to place the bias chamber in communication with a source of working fluid under pressure, an outlet bleed passage leading out of the bias chamber, and inlet and outlet control valves operatively associated with the inlet and outlet bleed passages respectively, with each control valve including a valve stem adapted to be slidably displaced to open the control valve, and an actuating member operatively connected to the control means of the first and second valves and adapted to allow both independent and simultaneous actuation of the control means of the two valves, the actuating member comprising an actuating disc mounted on a fulcrum on the double valve, and having the valve stems operatively connected to the actuating disc at spaced intervals around the periphery of the disc, each valve stem being slidably connected to the disc to allow the disc to be displaced relatively to the valve stem, and each valve stem having shoulder means to engage with the disc and cause the valve stem to be displaced in at least one direction by the disc.

2. A double valve according to claim 1, in which the valve stems are operatively connected to the actuating disc at equally spaced intervals around the periphery of the disc.

3. A double valve according to claim 1, including bias means to bias the control valves into their closed positions.

4. A double valve according to claim 1, in which the downstream sides of the flow passages of the first and second valves, are common.

* * * * *